(12) United States Patent
Van Mullem et al.

(10) Patent No.: US 9,470,312 B2
(45) Date of Patent: Oct. 18, 2016

(54) APPARATUS AND METHOD FOR A SEALING SYSTEM

(71) Applicant: Telsmith, Inc., Mequon, WI (US)

(72) Inventors: Albert Van Mullem, Sussex, WI (US); Matthew Haven, Cedarburg, WI (US); Chuck Dricken, Kewaskum, WI (US); Sean Neitzel, Kronenwetter, WI (US)

(73) Assignee: Telsmith, Inc., Mequon, WI (US)

( * ) Notice: Subject to any disclaimer, the term of this patent is extended or adjusted under 35 U.S.C. 154(b) by 0 days.

(21) Appl. No.: 14/346,191

(22) PCT Filed: Sep. 21, 2012

(86) PCT No.: PCT/US2012/056459
§ 371 (c)(1),
(2) Date: Mar. 20, 2014

(87) PCT Pub. No.: WO2013/043951
PCT Pub. Date: Mar. 28, 2013

(65) Prior Publication Data
US 2014/0234049 A1  Aug. 21, 2014

Related U.S. Application Data

(60) Provisional application No. 61/626,128, filed on Sep. 21, 2011.

(51) Int. Cl.
*F16J 15/16* (2006.01)
*F16J 15/06* (2006.01)
(Continued)

(52) U.S. Cl.
CPC ............... *F16J 15/061* (2013.01); *B02C 2/00* (2013.01); *F16B 33/004* (2013.01); *F16H 25/2418* (2013.01); *Y10T 29/49826* (2015.01)

(58) Field of Classification Search
CPC ...... F16J 15/164; F16J 15/3288; F16J 9/062; F16J 15/003; F16J 15/008; B02C 2/00; F16B 33/004; F16H 25/2418; Y10T 29/49826
USPC ................. 277/301, 311; 403/288, 342, 343; 285/355; 74/89.4
See application file for complete search history.

(56) References Cited

U.S. PATENT DOCUMENTS 1,785,406 A * 12/1930 Cornett ............. B23Q 11/0875
411/427
2,091,374 A *  8/1937 Pease ..................... F16K 51/00
144/252.1
(Continued)

OTHER PUBLICATIONS 14-346191 Dovetail—definition.*

*Primary Examiner* — Kristina Fulton
*Assistant Examiner* — Nathan Cumar
(74) *Attorney, Agent, or Firm* — Chambliss, Bahner & Stophel, P.C.

(57) ABSTRACT

A sealing system adapted for use on an item of equipment having a male threaded component including a male threaded section having an interior portion. The sealing system comprises a female threaded component having a female threaded section and a scraper seal groove. The sealing system also comprises a scraper seal that is configured to be disposed in the scraper seal groove of the female threaded component and fit into the male threaded section of the male threaded component. The forces produced by the item of equipment pass directly to the female threaded component from the male threaded section. A method for sealing an interior portion of a threaded section of the male threaded component comprising providing such a sealing system and screwing the male threaded component, into the female threaded component.

19 Claims, 8 Drawing Sheets

(51) Int. Cl.
*B02C 2/00* (2006.01)
*F16B 33/00* (2006.01)
*F16H 25/24* (2006.01)

(56) References Cited

U.S. PATENT DOCUMENTS

| | | | |
|---|---|---|---|
| 2,757,548 A * | 8/1956 | Smith et al. | 74/89.41 |
| 4,053,167 A * | 10/1977 | Jelinek | 277/354 |
| 4,440,423 A * | 4/1984 | Pfeifler, II | 285/25 |
| 4,905,533 A * | 3/1990 | Benton et al. | 74/89.4 |
| 5,029,877 A * | 7/1991 | Fedeli | 277/354 |
| 5,324,047 A * | 6/1994 | Organ et al. | 277/354 |
| 2008/0092678 A1* | 4/2008 | Liao | F16C 29/084 74/89.4 |

* cited by examiner

APPARATUS AND METHOD FOR A SEALING SYSTEM

CROSS-REFERENCES TO RELATED APPLICATIONS/PATENTS

This application relates back to and claims priority from U.S. Provisional Application for Pat. No. 61/626,128 titled "Sealing System for a Low-Profile Cone Crusher" and filed on Sep. 21, 2011.

FIELD OF THE INVENTION

The present invention relates generally to sealing systems adapted for use on threaded equipment, and particularly to sealing systems to gyratory cone crushers.

BACKGROUND AND DESCRIPTION OF THE PRIOR ART

It is known to use circular seals prevent dirt and dust from getting into the threaded areas of the crusher wear adjustment system associated with the cone crusher support bowl. Conventional circular seals, however, suffer from one or more disadvantages. For example, the support bowl of the conventional rock crusher is extended so as to provide a non-threaded cylindrical surface on which the conventional seal can contact. The extended support bowl of the conventional rock crusher requires the upper frame of the crusher to be extended to match the extended support bowl. The extended support bowl and the extended upper frame of conventional rock crushers undesirably increase the height, weight and expense of the crusher. In addition, in the conventional rock crusher having an extended support bowl and an extended upper frame, crushing forces are cantilevered around the sealing surface. Conventional seals are also undesirably large and expensive.

It would be desirable, therefore, if an apparatus and method for a sealing system for a low-profile upper frame could be provided that would eliminate the need for an extended support bowl and an extended upper frame. It would also be desirable if such an apparatus and method could be provided that would reduce the height, weight and expense of a crusher. It would be further desirable if such an apparatus and method could be provided that would allow crushing forces to pass directly to the upper frame of the crusher instead of being cantilevered around the sealing surface. It would be still further desirable if such an apparatus and method could be provided that would reduce the size and cost of the seal.

ADVANTAGES OF THE PREFERRED EMBODIMENTS OF THE INVENTION

Accordingly, it is an advantage of the preferred embodiments of the invention claimed herein to provide an apparatus and method for a cone crusher having a reduced height and mass made possible by a thread sealing system. It is also an advantage of the preferred embodiments of the invention claimed herein to provide an apparatus and method for a sealing system for a low-profile upper frame and a low-profile concave support bowl that reduces the height, weight and expense of a crusher. It is a further advantage of the preferred embodiments of the invention claimed herein to provide an apparatus and method for a sealing system for a low-profile upper frame and support bowl that allows crushing forces to pass directly to the upper frame of the crusher instead of being cantilevered around the sealing surface of the support bowl. It is a still further advantage of the preferred embodiments of the invention claimed herein to provide an apparatus and method for a sealing system for a low-profile crusher that reduces the size and cost of the seal.

Additional advantages of the preferred embodiments of the invention will become apparent tram an examination of the drawings and the ensuing description.

SUMMARY OF THE INVENTION

The apparatus of the invention comprises a sealing system adapted for use on an item of equipment having a male threaded component including a male threaded section having an interior portion. The preferred sealing system comprises a female threaded component having a female threaded section and a scraper seal groove. The preferred sealing system also comprises a scraper seal that is configured to be disposed in the scraper seal groove of the female threaded component and fit into the male threaded section of the male threaded component. In the preferred embodiments of the sealing system, the forces produced by the item of equipment pass directly to the female threaded component from the male threaded section.

The method of the invention comprises a method for sealing an interior portion of a threaded section of a male threaded component. The preferred method comprises providing a sealing system. The preferred sealing system comprises a female threaded component having a female threaded section and a scraper seal groove. The preferred sealing system also comprises a scraper seal that is configured to be disposed in the scraper seal groove of the female threaded component and fit into the male threaded section of the male threaded component. In the preferred embodiments of the sealing system, the forces produced by the item of equipment pass directly to the female threaded component from the male threaded section. The preferred method further comprises screwing the male threaded component into the female threaded component.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
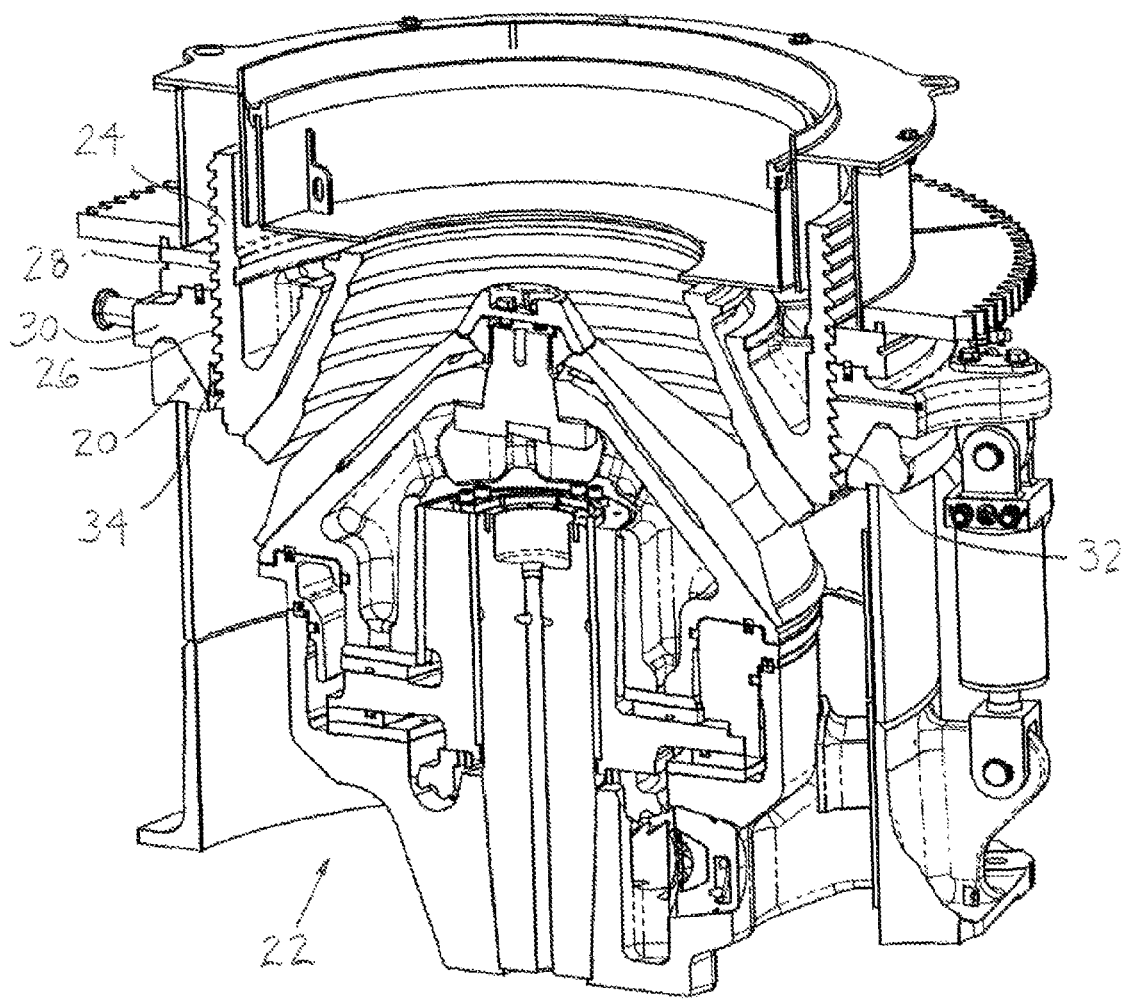
FIG. 1 is a sectional perspective view of the preferred embodiment of the sealing system in accordance with the present invention.

Referring now to the drawings, the preferred embodiments of the sealing system in accordance with the present invention are illustrated by FIGS. 1 through 8. As shown in FIGS. 1-8, the preferred embodiments of the sealing system are adapted to provide a crusher having a reduced height and mass. The preferred embodiments of the sealing system also provide a low-profile upper frame and a low-profile concave support bowl that reduces the height, weight and expense of a crusher. The preferred embodiments of the sealing system provide a low-profile upper frame and support bowl that allows crushing forces to pass directly to the main frame of the crusher instead of being cantilevered around the sealing surface of the support bowl. The preferred embodiments of the sealing system also reduce the size and cost of the seal.

Referring now to FIG. 1, a sectional perspective view of the preferred embodiment of the sealing system in accordance with the present invention is illustrated. As shown in FIG. 1, the preferred sealing system is designated generally by reference numeral 20. Preferred sealing system 20 is adapted for use on an item of equipment such as exemplary rock crusher 22. Exemplary rock crusher 22 has a male threaded component such as support bowl 24 with a male threaded section such as support bowl threaded section 26. Preferred support bowl threaded section 26 has interior portion 28. Preferred interior portion is 28 comprises the portion of the male threaded section that has been screwed past a scraper seal disposed on a female threaded component. Preferred sealing system 20 includes a female threaded component such as upper frame 30. Preferred upper frame 30 has a female threaded section such as upper frame threaded section 32 and a scraper seal groove.

Still referring to FIG. 1, preferred sealing system 20 also includes scraper seal 34. Preferred scraper seal 34 is configured to be disposed in the scraper seal groove of upper frame 30 and fit into support bowl threaded section 26 of support bowl 24. Preferably, scraper seal 34 is removably disposed in the scraper seal groove of upper frame 30. It is also contemplated within the scope of the invention, however, that the scraper seal may be fixedly disposed in the scraper seal groove of the upper frame. Preferred scraper seal 34 is adapted to separate contaminants from the interior portion of support bowl threaded section 26 and upper frame threaded section 32. Preferred scraper seal 34 is also adapted to clean support bowl threaded section 26 when support bowl 24 is threaded or screwed into upper frame 30. In the preferred sealing system 20, forces produced by the item of equipment pass directly to upper frame 30 from support bowl threaded section 26. While FIG. 1 illustrates the preferred configuration and arrangement of sealing system 20, it is contemplated within the scope of the invention that the sealing system may be of any suitable configuration and arrangement.

Figure 2:
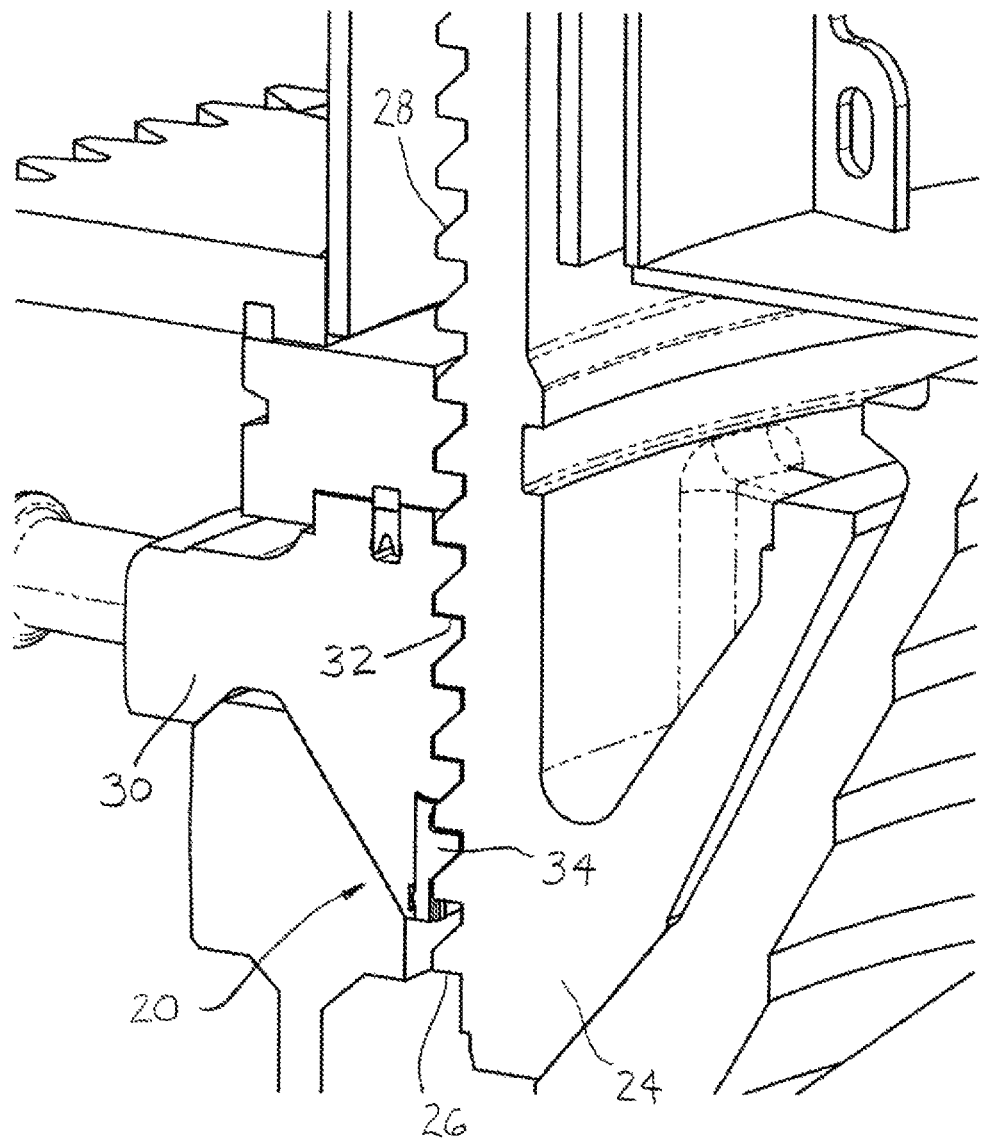
FIG. 2 is a sectional perspective view of the preferred sealing system illustrated in FIG. 1.

Referring now to FIG. 2, a sectional perspective view of preferred sealing system 20 is illustrated. As shown in FIG. 2, preferred sealing system 20 comprises support bowl 24, support bowl threaded section 26, interior portion 28, upper frame 30, upper frame threaded section 32 and scraper seal 34. Preferred scraper seal 34 is adapted to clean support bowl threaded section 26 of support bowl 24.

Figure 3:
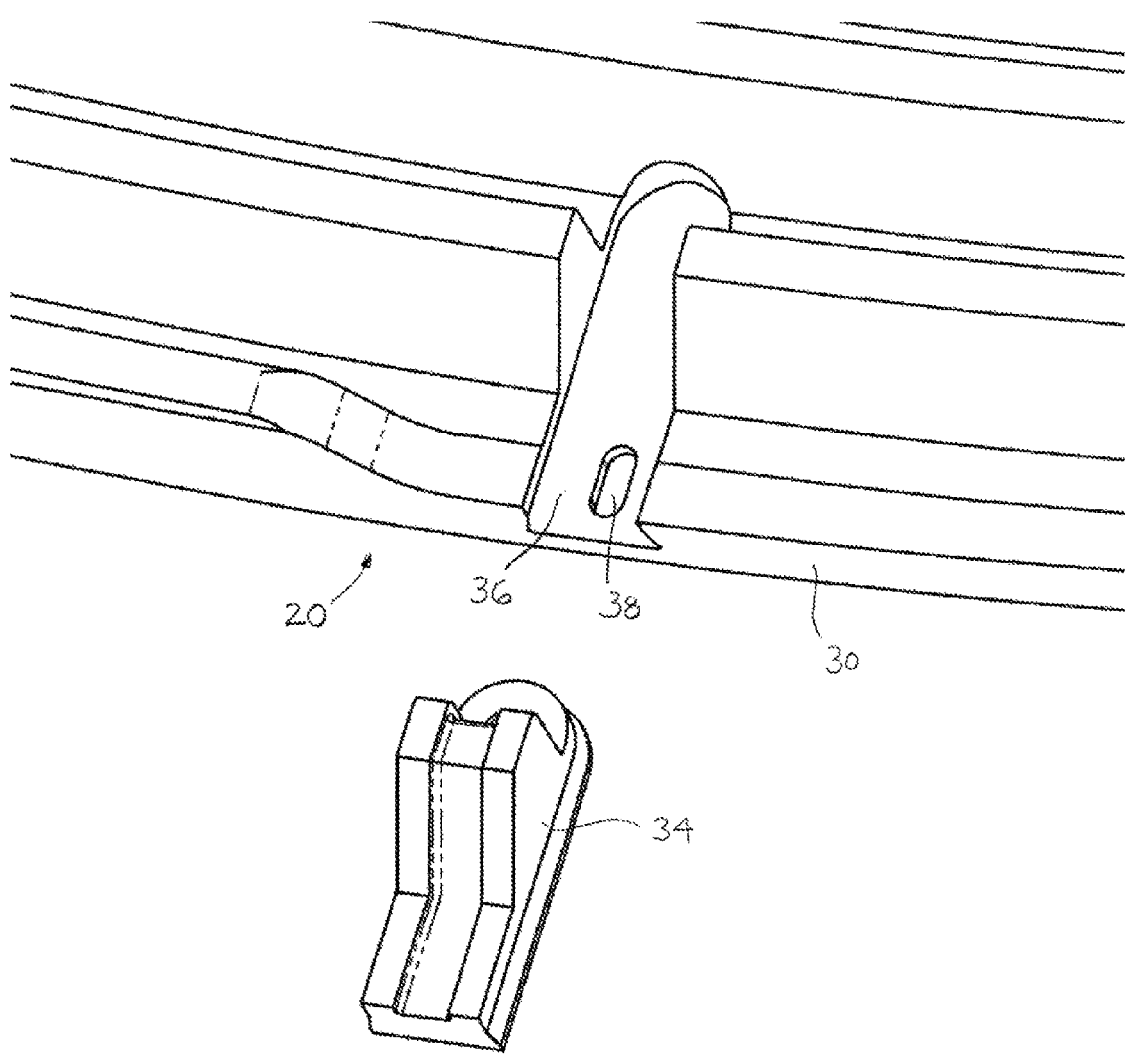
FIG. 3 is a perspective view of the preferred sealing system illustrated in FIGS. 1-2.

Referring now to FIG. 3, a perspective view of preferred sealing system 20 is illustrated. More particularly FIG. 3 illustrates preferred scraper seal 34 removed from scraper seal groove 36. As shown in FIG. 3, preferred upper frame 30 includes scraper seal groove 36 and depressed portion 38. Preferably, scraper seal 34 is adapted to be removably received in scraper seal groove 36. While FIG. 3 illustrates the preferred configuration and arrangement of the upper frame and the scraper seal, it is contemplated within the scope of the invention that the upper frame and the scraper seat may be of any suitable configuration and arrangement.

Figure 4:
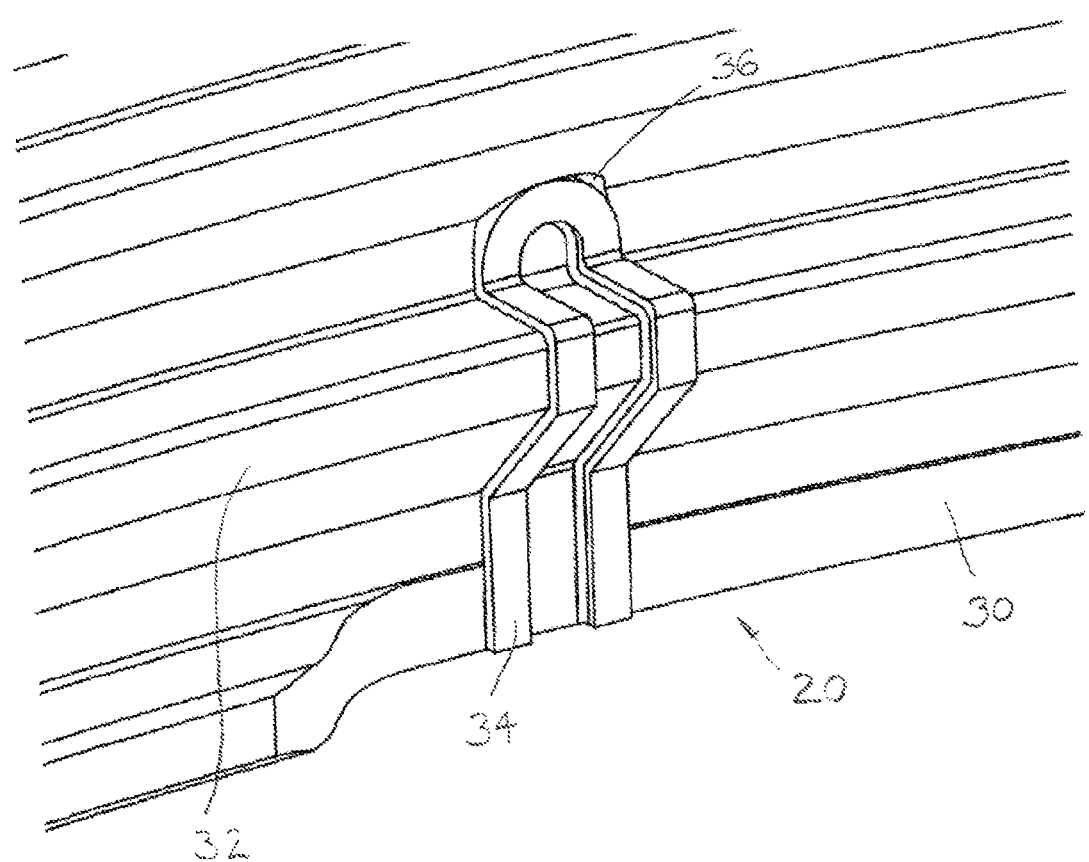
FIG. 4 is a perspective view of the preferred sealing system illustrated in FIGS. 1-3.

Referring now to FIG. 4, a perspective view of preferred sealing system 20 is illustrated. More particularly, FIG. 4 illustrates preferred scraper seal 34 inserted into scraper seal groove 36. As shown in FIG. 4, preferred scraper seal 34 is adapted to be received in scraper seal groove 36 of upper frame 30. The preferred female threaded section or upper frame threaded section 32 has a female thread profile and scraper seal 34 has a scraper seal profile. Preferably, the scraper seal profile extends beyond the female thread profile when scraper seal 34 is disposed in the scraper seal groove 36.

Figure 5:
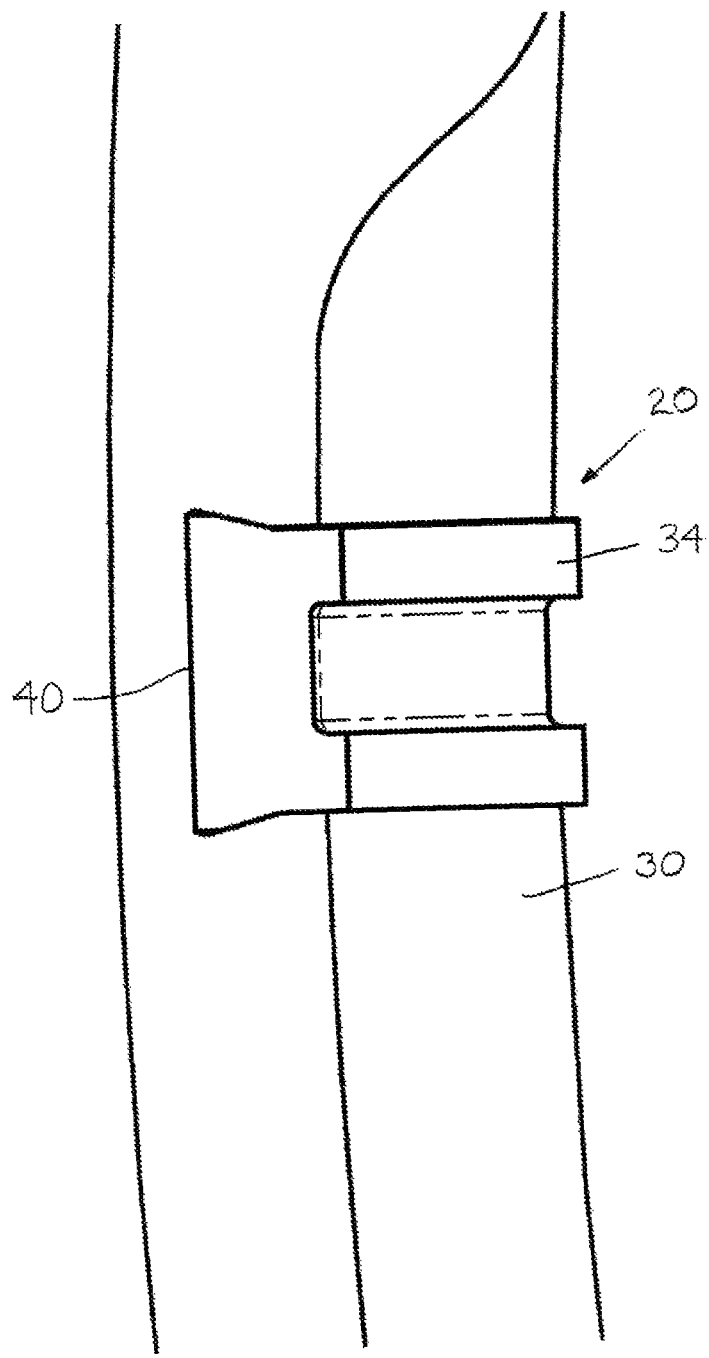
FIG. 5 is a sectional top view of the preferred sealing system illustrated in FIGS. 1-4.

Referring now to FIG. 5, a sectional top view of preferred sealing system 20 is illustrated. As shown in FIG. 5, preferred scraper seal 34 is adapted to be received in the scraper seal groove 36 of upper frame 30. More particularly, preferred scraper seal 34 includes dovetailed back 40 and the scraper seal groove is adapted to receive the dovetailed back of the scraper seal.

Figure 6:
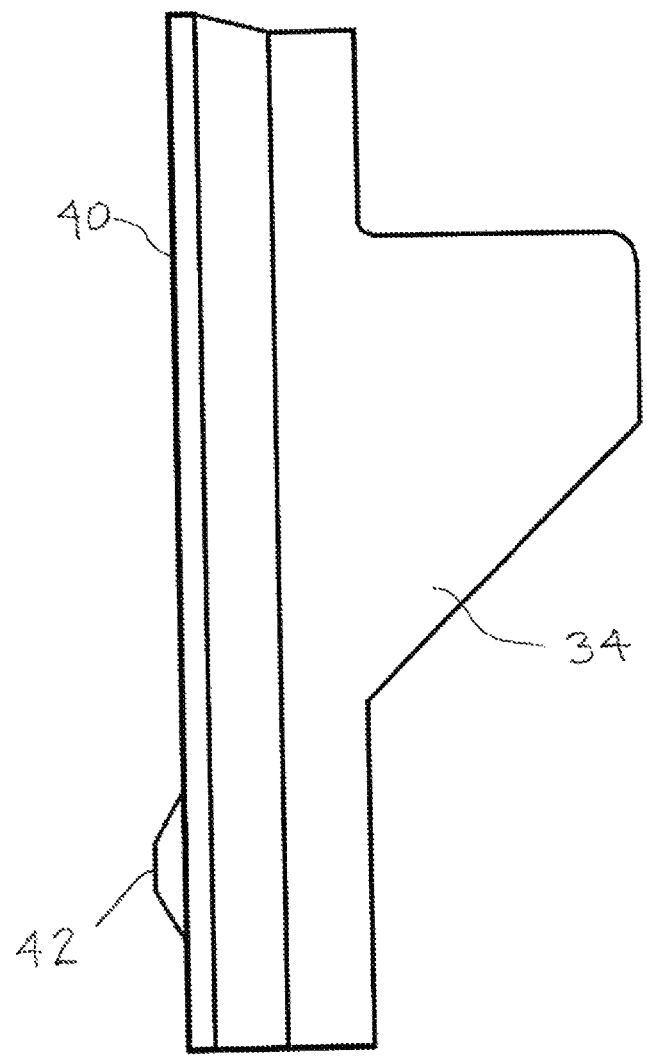
FIG. 6 is a left side view of the preferred scraper seal of the sealing system illustrated in FIGS. 1-5.

Referring now to FIG. 6, a left side view of preferred scraper seal 34 of sealing system 20 is illustrated. As shown in FIG. 6, preferred scraper seal 34 includes raised portion 42 disposed on dovetailed back 40. Preferably, raised portion 42 is disposed so as to be received by depressed portion 38 of scraper seal groove 36 in upper frame 30. While FIGS. 5 and 6 illustrate the preferred configuration and arrangement of the scraper seal and scraper seal groove, it is contemplated within the scope of the invention that the scraper seal and scraper seal groove may be of any suitable configuration and arrangement. It is also contemplated within the scope of the invention that the scraper seal may be removably retained in the scraper seal groove by any suitable device, mechanism, assembly or combination thereof.

Figure 7:
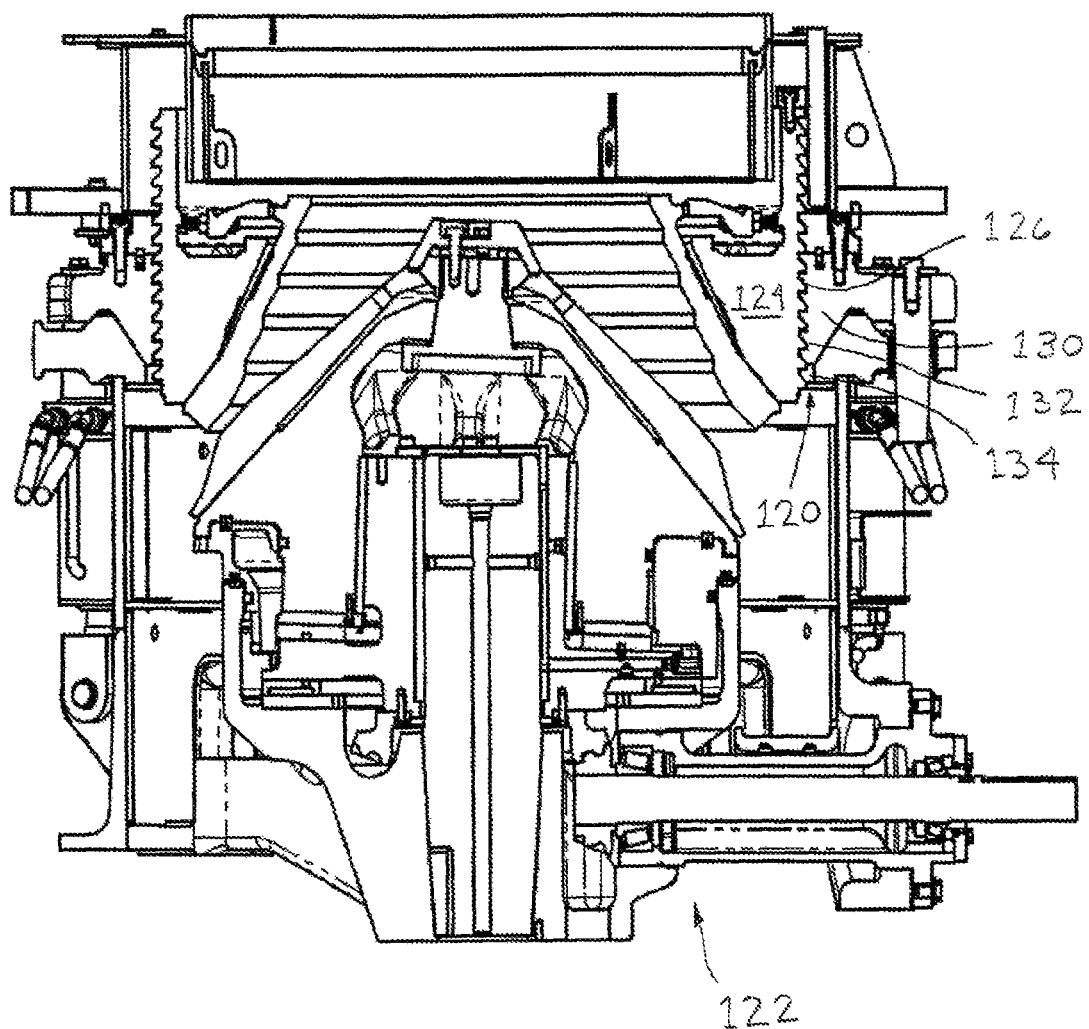
FIG. 7 is a sectional front view of a first alternative embodiment of the sealing system in accordance with the present invention.

Referring now to FIG. 7, a sectional front view of exemplary rock crusher 122 including first alternative embodiment of the sealing system in accordance with the present invention is illustrated. As shown in FIG. 7, the preferred sealing system is designated generally b reference numeral 120. Preferred sealing system 120 comprises upper frame 130, upper frame threaded section 132 and scraper seal 134. Preferred scraper seal 134 is adapted to clean support howl threaded section 126 of support bowl 124. As also shown in FIG. 3, forces produced by the exemplary rock crusher 122 pass directly to upper frame 130 from support bowl threaded section 126. While FIG. 7 illustrates a preferred configuration and arrangement of the sealing system in accordance with the present invention, it is contemplated within the scope of the invention that the sealing system may be of any suitable configuration and arrangement.

Figure 8:
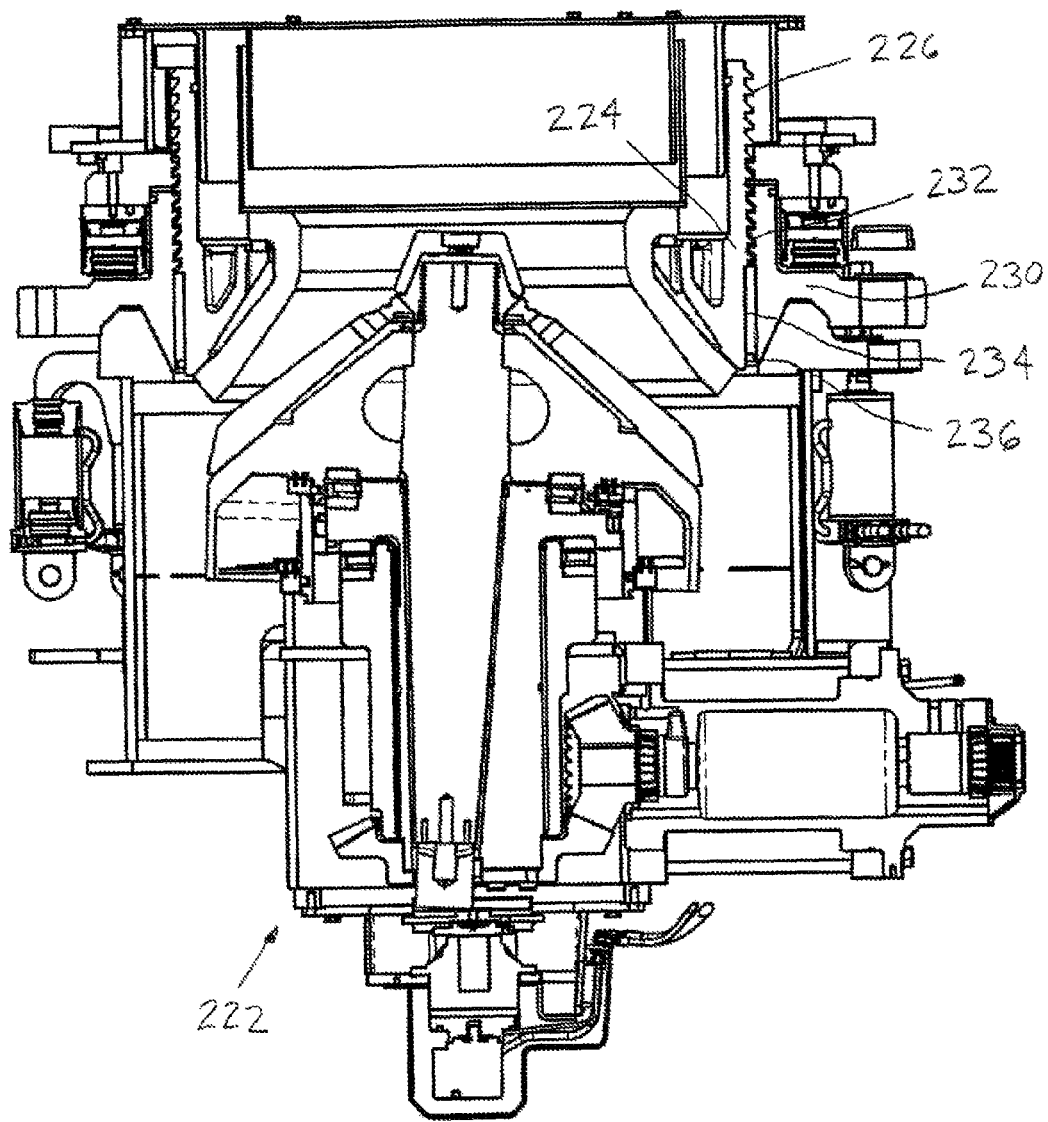
FIG. 8 is a sectional front view of an exemplary prior art rock crusher.

Referring now to FIG. 8, a sectional front view of an exemplary prior art rock crusher is illustrated. As shown in FIG. 8, the exemplary prior art rock crusher is designated generally by reference numeral 222. Exemplary prior art rock crusher 222 comprises support bowl 224, support bowl threaded section 226, upper frame 230 and upper frame threaded section 232. As shown in FIG. 8, upper frame threaded section 232 of upper frame 230 of exemplary prior art rock crusher 222 is larger than the preferred upper frame threaded section 32 and 132 of upper frame 30 and 130, respectively. In addition, support bowl 224 includes nonthreaded cylindrical surface 234 on which seal 236 can contact. As a result, the vertical dimension of exemplary prior art rock crusher 222 is larger than the vertical dimension of preferred rock crushers 22 and 122. In addition, crushing forces produced by exemplary prior art rock crusher 222 are cantilevered around non-threaded cylindrical surface 234 instead of passing directly to upper frame 230. Further, seal 236 is large and extends around the entire diameter of support bowl 224.

The method of the invention comprises a method for sealing an interior portion of a threaded section of a male threaded component. The preferred method comprises providing a sealing system. The preferred sealing system comprises a female threaded component having a female threaded section and a scraper seal groove. The preferred sealing system also comprises a scraper seal that is configured to be disposed in the scraper seal groove of the female threaded component and fit into the male threaded section of the male threaded component. In the preferred embodiments of the sealing system, the forces produced by the item of equipment pass directly to the female threaded component from the male threaded section. The preferred method further comprises screwing the male threaded component into the female threaded component. In alternative embodiments, the method comprises removing the scraper seal from the female threaded component, inserting the scraper seal into the female threaded component, cleaning the threaded section of the male threaded section and separating contaminants from the interior portion of the male threaded section and the female threaded section.

In operation, several advantages of the preferred embodiments of the invention are achieved. For example, the preferred embodiments of the sealing system are adapted to provide a crusher having a reduced height and mass. The preferred embodiments of the sealing system also provide a low-profile upper frame and a low-profile concave support bowl that reduces the height, weight and expense of a crusher. The preferred embodiments of the sealing system provide as low-profile upper frame and support bowl that allows crushing forces to pass directly to the main frame of the crusher instead of being cantilevered around the sealing surface of the support bowl. The preferred embodiments of the sealing system also reduce the size and cost of the seal. The preferred embodiments of the sealing system are further adapted to separate contaminants from the interior portion of the support bowl threaded section and the upper frame threaded section. The preferred embodiments of the scaling system are further adapted to clean the support bowl threaded section as the support bowl is screwed upwardly into the upper frame.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A sealing system adapted for use on an item of equipment having a male threaded component with a male threaded section, said male threaded section having an interior portion, said sealing system comprising:
   (a) a female threaded component, said female threaded component having a female threaded section, a female threaded section circumference, and a scraper seal groove;
   (b) a scraper seal, said scraper seal being configured to be disposed in the scraper seal groove of the female threaded component and fit into the male threaded section of the male threaded component;
   wherein forces produced by the item of equipment pass directly to the female threaded component from the male threaded section, and wherein the scraper seal groove and the scraper seal extend along only a small portion of the arc of the female threaded section circumference; and wherein the scraper seal includes a raised portion.

2. The sealing system of claim 1 wherein the scraper seal is removably disposed in the scraper seal groove of the female threaded component.

3. The sealing system of claim 1 wherein the scraper seal is fixedly disposed in the scraper seal groove of the female threaded component.

4. The sealing system of claim 1 wherein the female threaded section has a female thread profile, the scraper seal has a scraper seal profile, and the scraper seal profile extends beyond the female thread profile when the scraper seal is disposed in the scraper seal groove.

5. The sealing system of claim 1 wherein the scraper seal is adapted to separate contaminants from the interior portion of the male threaded section and the female threaded section.

6. The sealing system of claim 1 wherein the scraper seal is adapted to clean the male threaded section when the male threaded component is threaded into the female threaded component.

7. The sealing system of claim 1 wherein the scraper seal includes a dovetailed back.

8. The sealing system of claim 7 wherein the scraper seal groove is adapted to receive the dovetailed back of the scraper seal.

9. The sealing system of claim 1 wherein the scraper seal groove includes a depressed portion adapted to receive the raised portion of the scraper seal.

10. A sealing system adapted for use on a rock crusher having a support bowl with a support bowl threaded section, said support bowl threaded section having an interior portion, said sealing system comprising:
    (a) an upper frame, said upper frame having an upper frame threaded section, an upper frame threaded section circumference, and a scraper seal groove;
    (b) a scraper seal, said scraper seal being configured to be disposed in the scraper seal groove of the upper frame and fit into the support bowl threaded section;
    wherein crushing forces produced by the rock crusher pass directly to the upper frame from the support bowl threaded section, and wherein the scraper seal groove and scraper seal extend along only a small portion of the arc of the upper frame threaded section circumference; and wherein the scraper seal includes a raised portion.

11. The sealing system of claim 10 wherein the scraper seal is removably disposed in the scraper seal groove of the upper frame.

12. The sealing system of claim 10 wherein the scraper seal is fixedly disposed in the scraper seal groove of the upper frame.

13. The sealing system of claim 10 wherein the upper frame threaded section has an upper frame thread profile, the scraper seal has a scraper seal profile, and the scraper seal profile extends beyond the upper frame thread profile when the scraper seal is disposed in the scraper seal groove.

14. The sealing system of claim 10 wherein the scraper seal is adapted to separate contaminants from the interior portion of the support bowl threaded section and the upper frame threaded section.

15. The sealing system of claim 10 wherein the scraper seal is adapted to clean the support bowl threaded section when the support bowl is threaded into the upper frame.

16. The sealing system of claim 10 wherein the scraper seal includes a dovetailed back.

17. The sealing system of claim 16 wherein the scraper seal groove is adapted to receive the dovetailed back of the scraper seal.

18. The sealing system of claim 10 wherein the scraper seal groove includes a depressed portion adapted to receive the raised portion of the scraper seal.

19. A method for sealing an interior portion of a threaded section of a male threaded component, said method comprising:

(a) providing a sealing system, said sealing system comprising:

(i) a female threaded component, said female threaded component having a female threaded section, a female threaded section circumference, and a scraper seal groove;

(ii) a scraper seal, said scraper seal being configured to be disposed in the scraper seal groove of the female threaded component and fit into the male threaded section of the male threaded component;

wherein forces produced by the item of equipment pass directly to the female threaded component from the male threaded section; wherein the scraper seal groove and the scraper seal extend along only a small portion of the arc of the female threaded section circumference; and wherein the scraper seal includes a raised portion; and (b) screwing the male threaded component into the female threaded component.

* * * * *